US009307563B2

(12) United States Patent
Tsai et al.

(10) Patent No.: US 9,307,563 B2
(45) Date of Patent: Apr. 5, 2016

(54) EVOLVED PACKET CORE LESS DIRECT MODE COMMUNICATION SYSTEM AND COMMUNICATION ATTACHING METHOD THEREOF

(71) Applicant: Institute For Information Industry, Taipei (TW)

(72) Inventors: Yi-Hsueh Tsai, New Taipei (TW); Kanchei Loa, Taipei (TW); Yi-Ting Lin, New Taipei (TW)

(73) Assignee: Institute For Information Industry, Taipei (TW)

( * ) Notice: Subject to any disclaimer, the term of this patent is extended or adjusted under 35 U.S.C. 154(b) by 289 days.

(21) Appl. No.: 13/875,996

(22) Filed: May 2, 2013

(65) Prior Publication Data

US 2013/0294437 A1 Nov. 7, 2013

Related U.S. Application Data

(60) Provisional application No. 61/642,466, filed on May 4, 2012, provisional application No. 61/672,785, filed on Jul. 18, 2012, provisional application No. 61/721,020, filed on Oct. 31, 2012.

(51) Int. Cl.
*H04W 76/02* (2009.01)
*H04W 4/02* (2009.01)
*H04W 64/00* (2009.01)
*H04W 84/12* (2009.01)

(52) U.S. Cl.
CPC .............. *H04W 76/023* (2013.01); *H04W 4/02* (2013.01); *H04W 64/00* (2013.01); *H04W 84/12* (2013.01)

(58) Field of Classification Search
CPC .......................... H04W 76/02; H04W 56/0025
USPC ........................................................ 370/350
See application file for complete search history.

(56) References Cited

U.S. PATENT DOCUMENTS

| 8,792,394 B2 | 7/2014 | Nagara |
| 2003/0144003 A1* | 7/2003 | Ranta et al. ................... 455/450 |
| 2009/0046683 A1* | 2/2009 | Jung et al. ..................... 370/338 |
| 2011/0082939 A1 | 4/2011 | Montemurro et al. |
| 2011/0106952 A1* | 5/2011 | Doppler et al. ............... 709/226 |

FOREIGN PATENT DOCUMENTS

| TW | 201134162 A1 | 10/2011 |
| TW | 201218839 A1 | 5/2012 |

OTHER PUBLICATIONS

Office Action to the corresponding Taiwan Patent Application rendered by Taiwan Intellectual Property Office (TIPO) on Feb. 25, 2015, 12 pages.

* cited by examiner

*Primary Examiner* — Ian N Moore
*Assistant Examiner* — Mewale Ambaye
(74) *Attorney, Agent, or Firm* — Skaar Ulbrich Macari, P.A.

(57) ABSTRACT

An evolved packet core less direct-mode communication system and a communication attaching method thereof are provided. The evolved packet core less direct-mode communication system comprises a client direct-mode communication apparatus and a server direct-mode communication apparatus. The server direct-mode communication apparatus transmits a synchronization signal to the client direct-mode communication apparatus. The client direct-mode communication apparatus synchronizes to the server direct-mode communication apparatus according to the synchronization signal and establishes a communication connection with the evolved packet core less direct-mode communication system after synchronization.

16 Claims, 13 Drawing Sheets

EVOLVED PACKET CORE LESS DIRECT MODE COMMUNICATION SYSTEM AND COMMUNICATION ATTACHING METHOD THEREOF

PRIORITY

This application claims the benefit of U.S. Provisional Application Ser. No. 61/642,466 filed on May 4, 2012, U.S. Provisional Application Ser. No. 61/672,785 filed on Jul. 18, 2012, and U.S. Provisional Application Ser. No. 61/721,020 filed on Oct. 31, 2012, each of which is hereby incorporated by reference herein in its entirety.

FIELD

The present invention relates to an evolved packet core less (EPC-less) direct-mode communication system and a communication attaching method thereof; and more particularly, the EPC-less direct-mode communication system and the communication attaching method thereof according to the present invention allow direct-mode communication apparatuses to create communication connections therebetween in the absence of an evolved packet core.

BACKGROUND

In a conventional direct-mode communication system, although apparatuses can communicate with each other directly, creation of communication connections and transmission of related control signals therebetween still rely on coordination operations of a backhaul core network. In other words, without the coordination operations of the backhaul core network, it would be impossible for the direct-mode communication apparatuses to successfully communicate with each other, and this significantly decreases the flexibility in use of the direct-mode communication apparatuses.

For example, when a rescuing team is carrying out a search and rescue task in a remote area, it is often impossible for direct-mode communication apparatuses or mobile base stations (e.g., mobile evolved NodeBs (eNodeBs)) to create a connection with the backhaul network due to remoteness of the area. Therefore, the conventional direct-mode communication apparatuses will fail to execute the data streaming transmission function without the coordination operations of the backhaul network.

Accordingly, an urgent need exists in the art to provide a solution that allows direct-mode communication apparatuses to be coordinated with and communicate with each other successfully in the absence of a backhaul core network so as to improve the flexibility in use of the direct-mode communication apparatuses.

SUMMARY

To solve the aforesaid problem, the present invention, in certain embodiments, provides an evolved packet core less (EPC-less) direct-mode communication system and a communication attaching method thereof. The EPC-less direct-mode communication system and the communication attaching method thereof can allow direct-mode communication apparatuses in the EPC-less direct-mode communication system to be synchronized to each other so that coordination operations prior to creation of a connection are accomplished to facilitate subsequent creation of the communication connection and transmission of data.

To achieve the aforesaid objective, certain embodiments of the present invention provide a communication attaching method for an evolved packet core less (EPC-less) direct-mode communication system. The EPC-less direct-mode communication system comprises a client direct-mode communication apparatus and a server direct-mode communication apparatus. The communication attaching method comprises: (a) enabling the server direct-mode communication apparatus to transmit a synchronization signal to the client direct-mode communication apparatus; (b) enabling the client direct-mode communication apparatus to synchronize to the server direct-mode communication apparatus according to the synchronization signal; and (c) enabling the client direct-mode communication apparatus to create a communication connection in the EPC-less direct-mode communication system after the step (b).

To achieve the aforesaid objective, certain embodiments of the present invention further provide an EPC-less direct-mode communication system, which comprises a client direct-mode communication apparatus and a server direct-mode communication apparatus. The server direct-mode communication apparatus transmits a synchronization signal to the client direct-mode communication apparatus. The client direct-mode communication apparatus synchronizes to the server direct-mode communication apparatus according to the synchronization signal, and creates a communication connection in the EPC-less direct-mode communication system after the synchronization.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. However, these example embodiments are not intended to limit the present invention to any specific examples, embodiments, environment, applications or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1A:
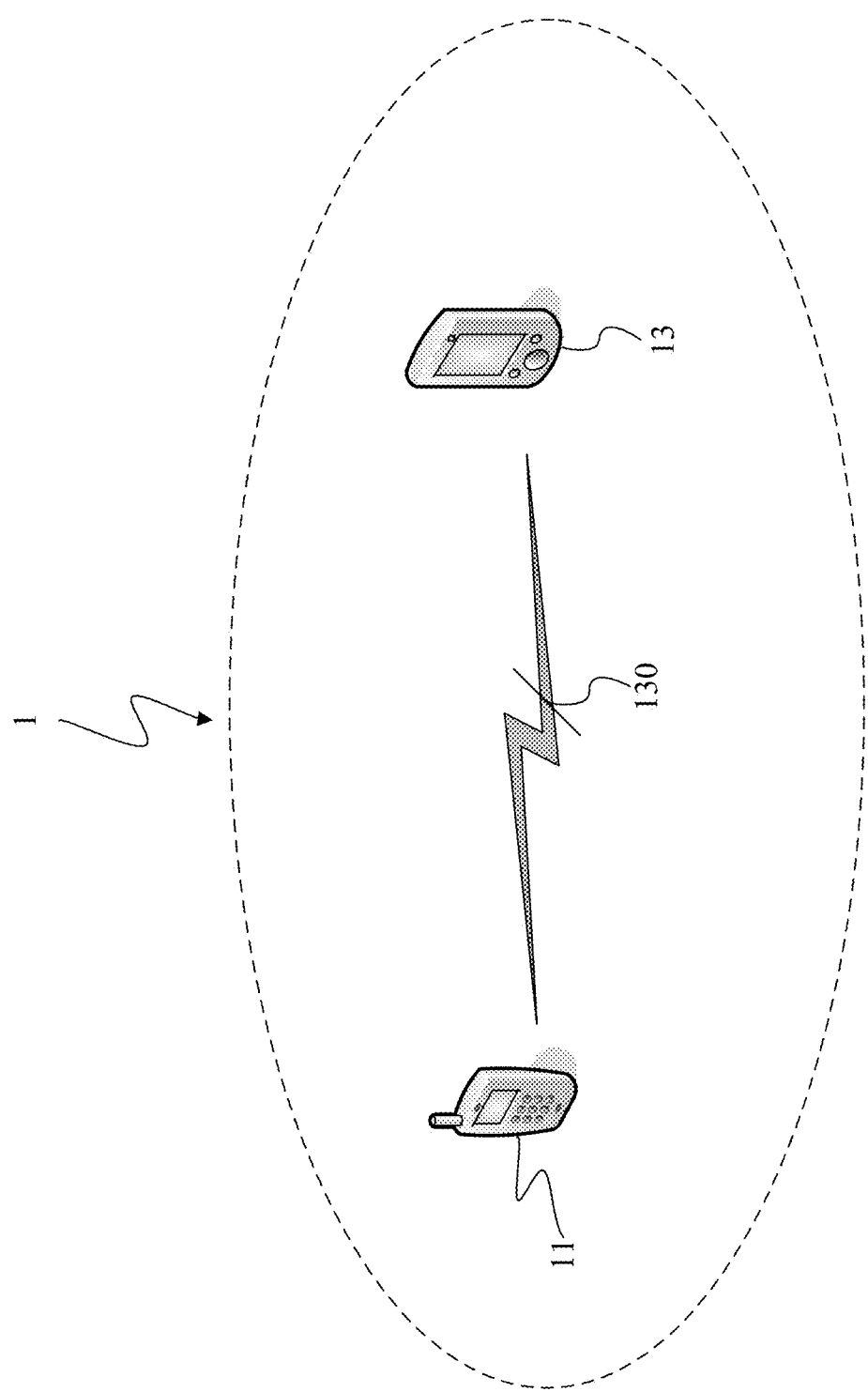
FIG. 1A is a schematic view of an EPC-less direct-mode communication system according to a first embodiment of the present invention.
Figure 1B:
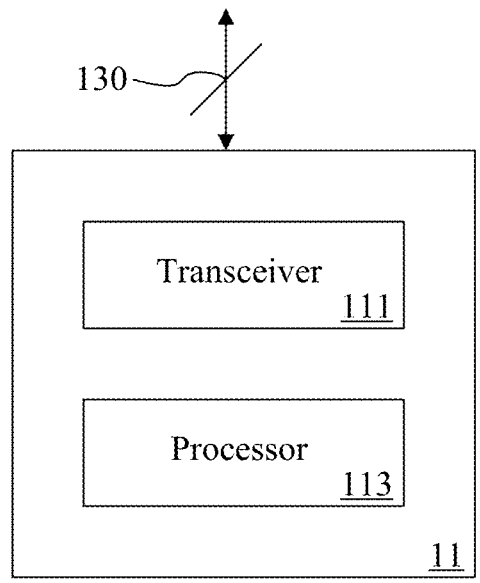
FIG. 1B is a schematic view of a first client direct-mode communication apparatus according to the first embodiment of the present invention.
Figure 1C:
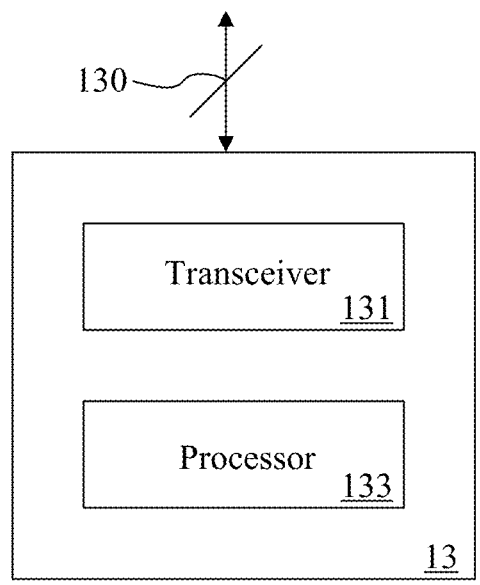
FIG. 1C is a schematic view of a first server direct-mode communication apparatus according to the first embodiment of the present invention.

Please refer to FIGS. 1A-1C. FIG. 1A is a schematic view of an EPC-less direct-mode communication system 1 according to a first embodiment of the present invention. The EPC-less direct-mode communication system 1 comprises a first client direct-mode communication apparatus 11 and a first server direct-mode communication apparatus 13. FIG. 1B is a schematic view of the first client direct-mode communication apparatus 11 according to the first embodiment of the present invention. The first client direct-mode communication apparatus 11 comprises a transceiver 111 and a processor 113. FIG. 1C is a schematic view of the first server direct-mode communication apparatus 13 according to the first embodiment of the present invention. The first server direct-mode communication apparatus 13 comprises a transceiver 131 and a processor 133. Interactions among the individual network components will be further described hereinafter.

Firstly, because the first client direct-mode communication apparatus 11 and the first server direct-mode communication apparatus 13 are deployed in an EPC-less architecture, initial communication coordination therebetween is needed in order to exchange data subsequently. Accordingly, the transceiver 131 of the first server direct-mode communication apparatus 13 transmits a synchronization signal 130 to the first client direct-mode communication apparatus 13 so that the synchronization signal 130 is received by the transceiver 111 of the first client direct-mode communication 11.

Then, the processor 113 of the first client direct-mode communication 11 can directly synchronize to a data processing period of the first server direct-mode communication apparatus 13 according to the synchronization signal 130 to facilitate subsequent data transmission. Finally, the processor 113 of the first client direct-mode communication apparatus 11 directly creates a communication connection in the EPC-less direct-mode communication system 1 via the transceiver 111 for purpose of data exchange.

In other words, the first client direct-mode communication apparatus 1 can, in the absence of the backhaul core network, exchange data with different devices in the system successfully via communication connections directly created between the first client direct-mode communication 1 and the different devices after the synchronization is completed. It shall be particularly noted that, the present invention will be described with reference to various embodiments thereof herein below, but these embodiments are not intended to limit implementations of the elements of the present invention.

Figure 2:
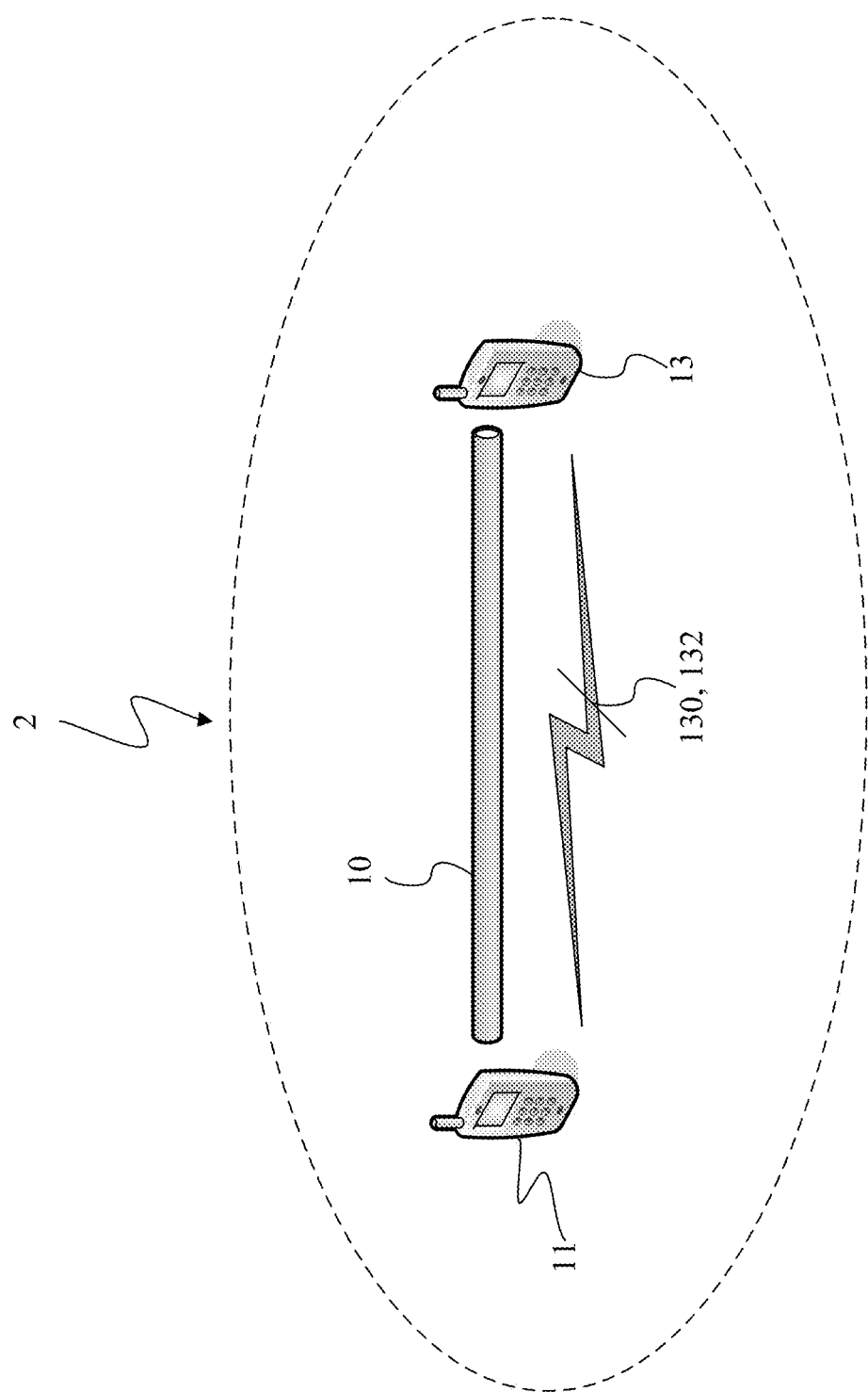
FIG. 2 is a schematic view of an EPC-less direct-mode communication system according to a second embodiment of the present invention.

Referring to FIG. 2, there is shown a schematic view of an EPC-less direct-mode communication system 2 according to a second embodiment of the present invention. The second embodiment has the same system framework and network connection environment as the first embodiment, so elements bearing the same reference numerals have the same functions and, thus, will not be described again herein. The second embodiment differs from the first embodiment in that, the first server direct-mode communication apparatus in the second embodiment is just a second client direct-mode communication apparatus having a powerful computational capacity. Therefore, because both the first client direct-mode communication apparatus and the first server direct-mode communication apparatus are client direct-mode communication apparatuses, a discovery signal can be used for coordination before communication.

In detail, two client direct-mode communication apparatuses which are to communicate with each other detect each other's presence mainly through transmission and reception of the discovery signal. Therefore, in the second embodiment, the transceiver 131 of the first server direct-mode communication apparatus 13 (i.e., the second client direct-mode communication apparatus) can transmit a discovery signal 132 to the first client direct-mode communication apparatus 11 in a signal detection period of the first client direct-mode communication apparatus 11. The synchronization signal 130 is comprised in the discovery signal 132.

Thus, the synchronization signal 130 can be obtained when the discovery signal 132 is received by the transceiver 111 of the first client direct-mode communication apparatus 11, and then the processor 113 can synchronize to the first server direct-mode communication apparatus 13 (i.e., the second client direct-mode communication apparatus) according to the synchronization signal 130 and, via the transceiver 111, directly creates a communication connection 10 with the first server direct-mode communication apparatus 13 (i.e., the second client direct-mode communication apparatus) for purpose of subsequent data exchange.

Figure 3:
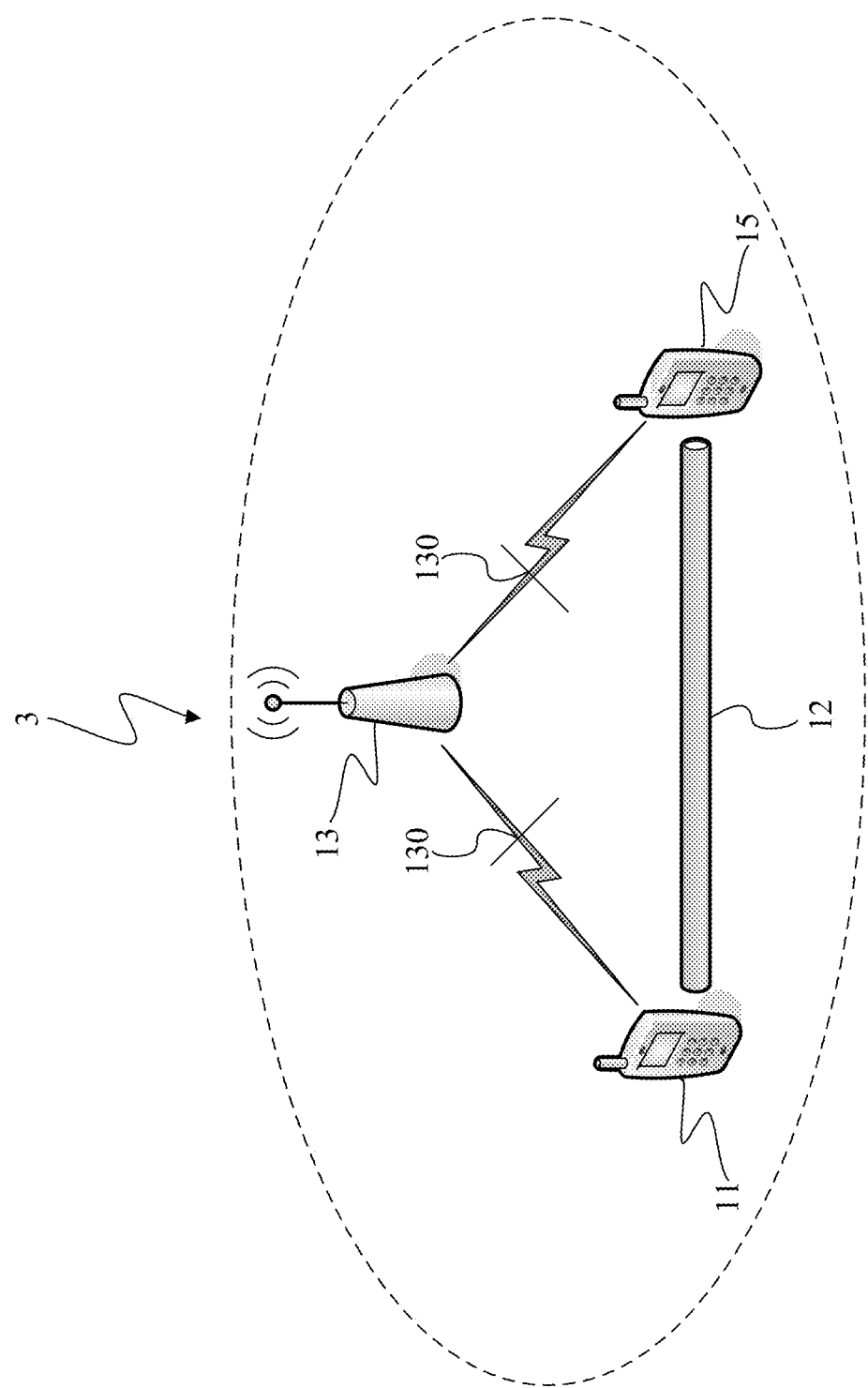
FIG. 3 is a schematic view of an EPC-less direct-mode communication system according to a third embodiment of the present invention.

Referring to FIG. 3, there is shown a schematic view of an EPC-less direct-mode communication system 3 according to a third embodiment of the present invention. The EPC-less direct-mode communication system 3 further comprises a second client direct-mode communication apparatus 15. The third embodiment has the same system framework and network connection environment as the previous embodiments, so elements bearing the same reference numerals have the same functions and, thus, will not be described again herein. The third embodiment differs from the previous embodiments in that, the first server direct-mode communication apparatus in the third embodiment is a third party direct-mode communication apparatus which mainly serves as a common reference for synchronization between client direct-mode communication apparatuses.

In detail, the transceiver 131 of the first server direct-mode communication apparatus 13 transmits the synchronization signal 130 to the first client direct-mode communication apparatus 11 and the second client direct-mode communication apparatus 15 at the same time in the third embodiment. Similar to the previous embodiments, the processor 113 of the first client direct-mode communication apparatus 11 can synchronize to the first server direct-mode communication apparatus 13 according to the synchronization signal 130 after the synchronization signal 130 is received by the transceiver 111.

Also similarly, the second client direct-mode communication apparatus 15 can also synchronize to the first server direct-mode communication apparatus 13 according to the synchronization signal 130 after receiving the synchronization signal 130. Then, as both the first client direct-mode communication apparatus 11 and the second client direct-mode communication apparatus 15 are synchronized to the first server direct-mode communication apparatus 13, the first client direct-mode communication apparatus 11 and the second client direct-mode communication apparatus 15 are also synchronized to each other.

Thus, when the first client direct-mode communication apparatus 11 which has been synchronized to the second client direct-mode communication apparatus 15 is to communicate with the second client direct-mode communication apparatus 15 directly, the transceiver 111 of the first client direct-mode communication apparatus 11 can receive a discovery signal of the second client direct-mode communication apparatus 15 in a signal detection period to determine that the second client direct-mode communication apparatus 15 is to connect with it. Then, the processor 113 of the first client direct-mode communication apparatus 11 can directly create a communication connection 12 with the second client direct-mode communication apparatus 15 via the transceiver 111.

Figure 4:
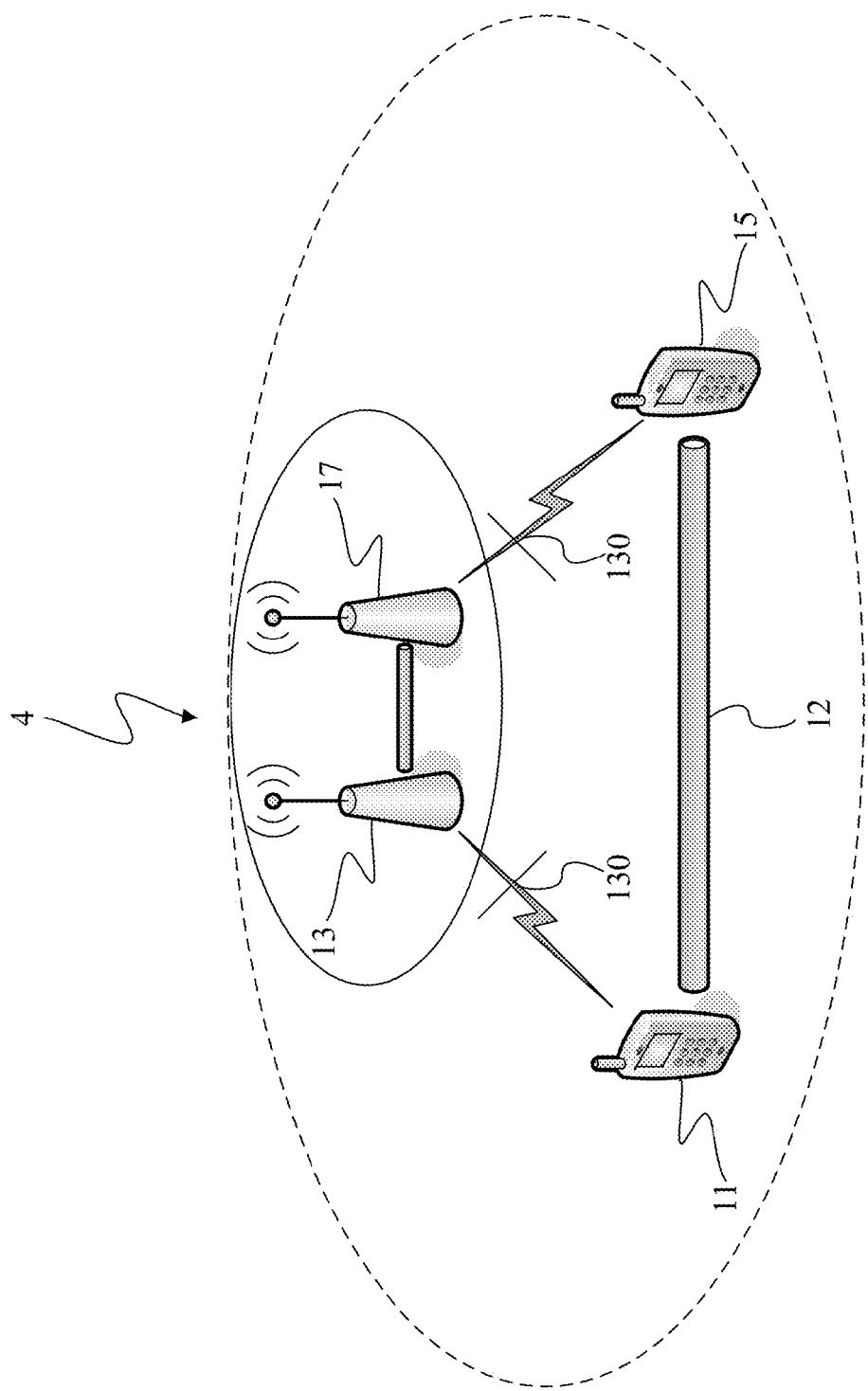
FIG. 4 is a schematic view of an EPC-less direct-mode communication system according to a fourth embodiment of the present invention.

Referring to FIG. 4, there is shown a schematic view of an EPC-less direct-mode communication system 4 according to a fourth embodiment of the present invention. The EPC-less direct-mode communication system 4 further comprises a second server direct-mode communication apparatus 17. The second server direct-mode communication apparatus 17 and the first server direct-mode communication apparatus 13 have a connection therebetween, and have the same synchronization signal 130. The fourth embodiment has the same system framework and network connection environment as the previous embodiments, so elements bearing the same reference numerals have the same functions and, thus, will not be described again herein. The fourth embodiment differs from the previous embodiments in that, different client direct-mode communication apparatuses synchronize to different server direct-mode communication apparatuses.

In detail, similar to the previous embodiments, the transceiver 131 of the first server direct-mode communication apparatus 13 transmits the synchronization signal 130 to the first client direct-mode communication apparatus 11, and the processor 113 of the first client direct-mode communication apparatus 11 synchronizes to the first server direct-mode communication apparatus 13 according to the synchronization signal 130 after the synchronization signal 130 is received by the transceiver 111.

On the other hand, because the second client direct-mode communication apparatus 15 mainly connects to the second server direct-mode communication apparatus 17, the synchronization signal 130 is transmitted to the second client direct-mode communication apparatus 15 by the second server direct-mode communication apparatus 17, and then the second client direct-mode communication apparatus 15 can synchronize to the second server direct-mode communication apparatus 17 after receiving the synchronization signal 130.

Thus, because the first client direct-mode communication apparatus 11 and the second client direct-mode communication apparatus 15 are synchronized to the first server direct-mode communication apparatus 13 and the second server direct-mode communication apparatus 17 respectively and the first server direct-mode communication apparatus 13 and the second server direct-mode communication apparatus 17 have the same synchronization signal 130, the first client direct-mode communication apparatus 11 and the second client direct-mode communication apparatus 15 are also synchronized to each other.

Similarly, when the first client direct-mode communication apparatus 11 which has been synchronized to the second client direct-mode communication apparatus 15 is to communicate with the second client direct-mode communication apparatus 15 directly, the transceiver 111 of the first client direct-mode communication apparatus 11 can receive a discovery signal of the second client direct-mode communication apparatus 15 in a signal detection period to determine that the second client direct-mode communication apparatus 15 is to connect with it. Then, the processor 113 of the first client direct-mode communication apparatus 11 can directly create a communication connection 12 with the second client direct-mode communication apparatus 15 via the transceiver 111.

Figure 5:
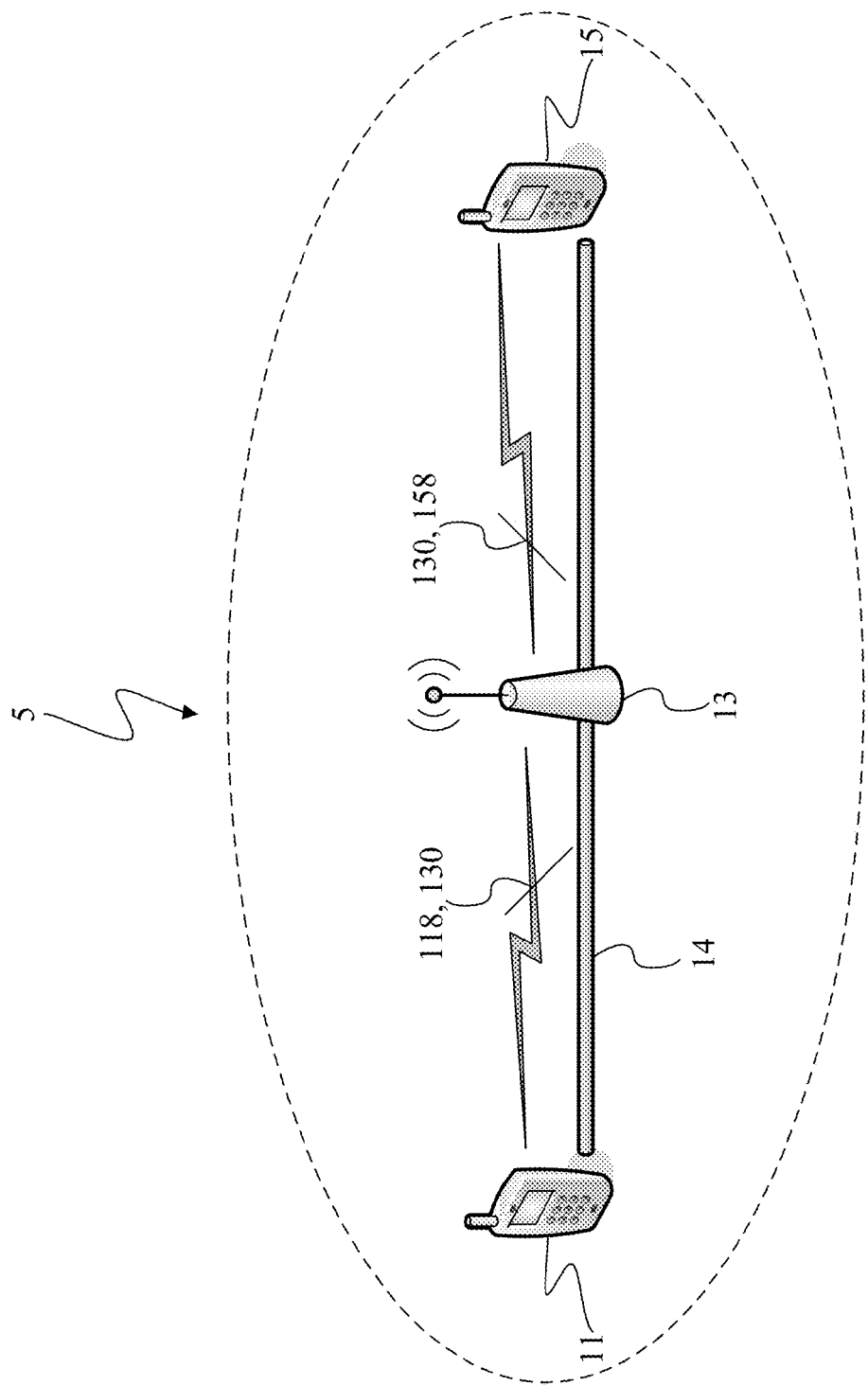
FIG. 5 is a schematic view of an EPC-less direct-mode communication system according to a fifth embodiment of the present invention.

Referring to FIG. 5, there is shown a schematic view of an EPC-less direct-mode communication system 5 according to a fifth embodiment of the present invention. The fifth embodiment has the same system framework and network connection environment as the previous embodiments, so elements bearing the same reference numerals have the same functions and, thus, will not be described again herein. The fifth embodiment differs from the previous embodiments in that, connections between client direct-mode communication apparatuses must be created through server direct-mode communication apparatuses.

Similarly, the transceiver 131 of the first server direct-mode communication apparatus 13 transmits the synchronization signal 130 to the first client direct-mode communication apparatus 11 and the second client direct-mode communication apparatus 15 at the same time in the fifth embodiment. Similar to the previous embodiments, the processor 113 of the first client direct-mode communication apparatus 11 can synchronize to the first server direct-mode communication apparatus 13 according to the synchronization signal 130 after the synchronization signal 130 is received by the transceiver 111. Next, a piece of first client information 118 is transmitted by the first client direct-mode communication apparatus 11 to the first server direct-mode communication apparatus 13 via the transceiver 111.

Also similarly, the second client direct-mode communication apparatus 15 can also synchronize to the first server direct-mode communication apparatus 13 according to the synchronization signal 130 after receiving the synchronization signal 130. Next, a piece of second client information 158 is transmitted by the second client direct-mode communication apparatus 15 to the first server direct-mode communication apparatus 13.

As both the first client direct-mode communication apparatus 11 and the second client direct-mode communication apparatus 15 are synchronized to the first server direct-mode communication apparatus 13, the first client direct-mode communication apparatus 11 and the second client direct-mode communication apparatus 15 are also synchronized to each other. Then, because the first server direct-mode communication apparatus 13 can receive the first client information 118 and the second client information 158 at the same time, the transceiver 131 of the first server direct-mode apparatus 13 can forward data between the first client direct-mode communication apparatus 11 and the second client direct-mode communication apparatus 15. In other words, the transceiver 111 of the first client direct-mode communication apparatus 11 can create the communication connection 14 with the second client direct-mode communication apparatus 15 via the first server direct-mode communication apparatus 13.

Figure 6:
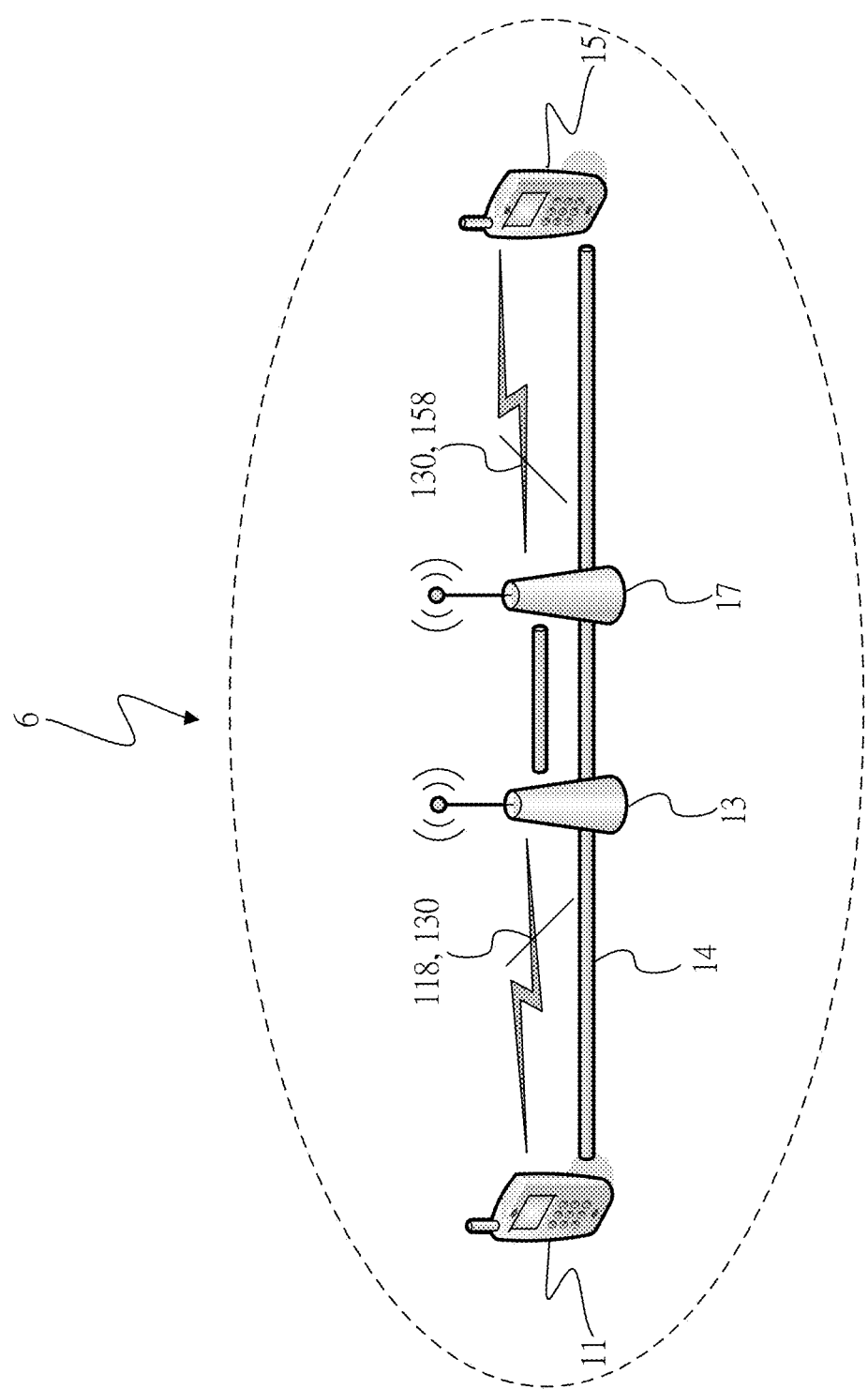
FIG. 6 is a schematic view of an EPC-less direct-mode communication system according to a sixth embodiment of the present invention.

Referring to FIG. 6, there is shown a schematic view of an EPC-less direct-mode communication system 6 according to a sixth embodiment of the present invention. The sixth embodiment has the same system framework and network connection environment as the previous embodiments, so elements bearing the same reference numerals have the same functions and, thus, will not be described again herein. The sixth embodiment differs from the previous embodiments in that, a connection between client direct-mode communication apparatuses must be created via different server direct-mode communication apparatuses.

In detail, similar to the previous embodiments, the transceiver 131 of the first server direct-mode communication apparatus 13 transmits the synchronization signal 130 to the first client direct-mode communication apparatus 11, and the processor 113 of the first client direct-mode communication apparatus 11 can synchronize to the first server direct-mode communication apparatus 13 according to the synchronization signal 130 after the synchronization signal 130 is received by the transceiver 111. Next, the first client direct-mode communication apparatus 11 transmits the first client information 118 to the first server direct-mode communication apparatus 13 via the transceiver 111.

On the other hand, because the second client direct-mode communication apparatus 15 mainly connects to the second server direct-mode communication apparatus 17, the synchronization signal 130 is transmitted to the second client direct-mode communication apparatus 15 by the second server direct-mode communication apparatus 17, and then the second client direct-mode communication apparatus 15 can synchronize to the second server direct-mode communication apparatus 17 after receiving the synchronization signal 130. Similarly, the second client direct-mode communication apparatus 15 transmits the second client information 158 to the second server direct-mode communication apparatus 17.

Thus, because the first client direct-mode communication apparatus 11 and the second client direct-mode communication apparatus 15 are synchronized to the first server direct-mode communication apparatus 13 and the second server direct-mode communication apparatus 17 respectively and the first server direct-mode communication apparatus 13 and the second server direct-mode communication apparatus 17 have the same synchronization signal 130, the first client direct-mode communication apparatus 11 and the second client direct-mode communication apparatus 15 are synchronized to each other.

Then because the first server direct-mode communication apparatus 13 can receive the first client information 118, the second server direct-mode communication apparatus 17 can receive the second client information 158, and the first server direct-mode communication apparatus 13 and the second server direct-mode communication apparatus 17 can exchange the first client information 118 and the second client information 158 therebetween via a connection, the transceiver 111 of the first client direct-mode communication apparatus 11 can create a communication connection 14 with the second client direct-mode communication apparatus 15 via the first server direct-mode communication apparatus 13 and the second server direct-mode communication apparatus 17.

It shall be particularly appreciated that, the connection between the first server direct-mode communication apparatus 13 and the second server direct-mode communication apparatus 17 may be an X2 interface connection. Even further, the connection between the first server direct-mode communication apparatus 13 and the second server direct-mode communication apparatus 17 may be created through grouping. Because this can be devised from the above disclosures by those skilled in the art, it will not be further described herein. Furthermore, the server direct-mode communication apparatuses described in the previous embodiments except for the second embodiment are preferably mobile base stations (e.g., mobile evolved nodeBs (eNBs)), but this is not intended to limit implementations of the server direct-mode communication apparatuses of the present invention.

Figure 7:
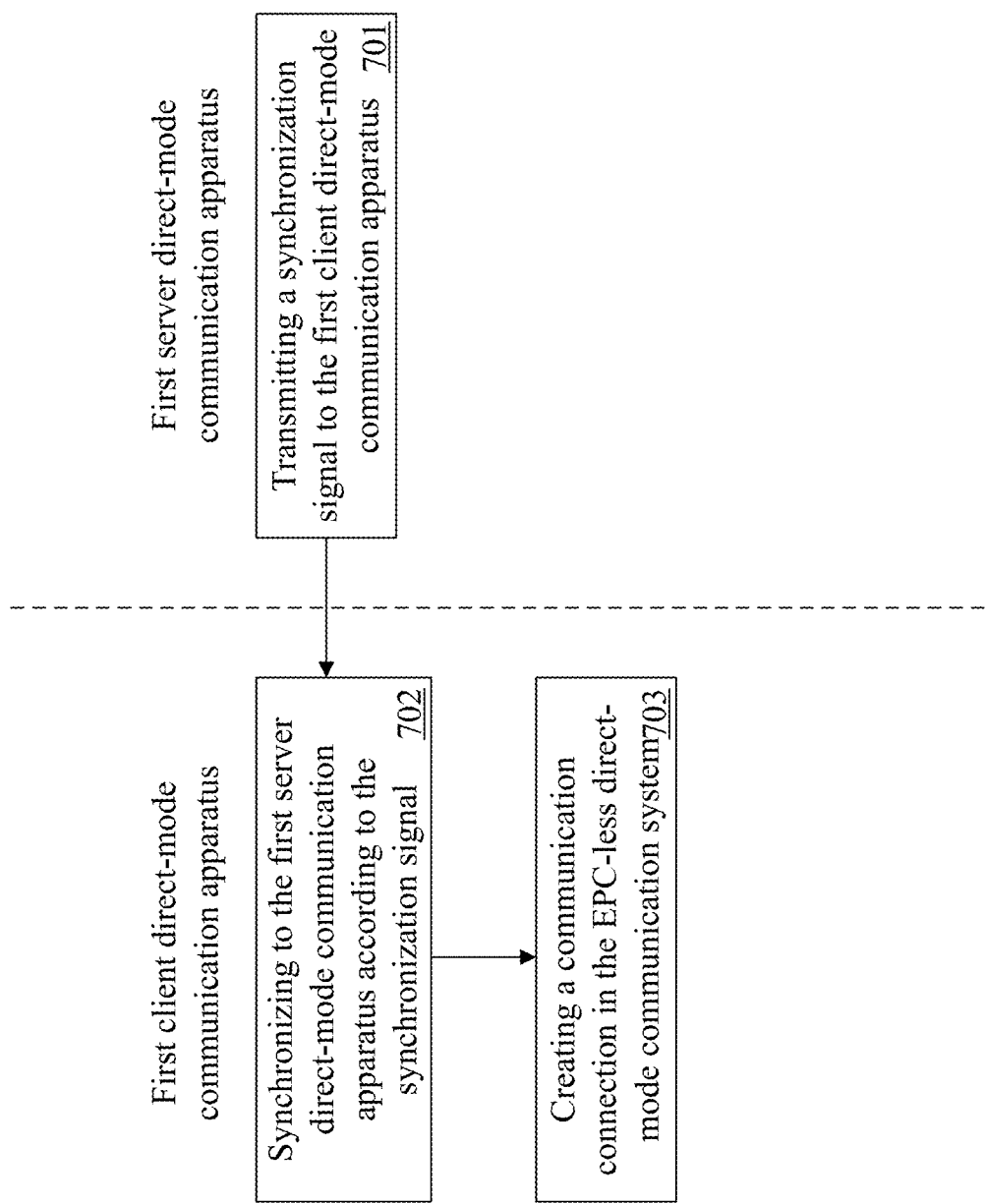
FIG. 7 is a flowchart diagram of a communication attaching method according to a seventh embodiment of the present invention.

A seventh embodiment of the present invention is a communication attaching method, a flowchart diagram of which is shown in FIG. 7. The method of the seventh embodiment is for use in an EPC-less direct-mode communication system (e.g., the EPC-less direct-mode communication system 1 of the previous embodiment) as well as a first client direct-mode communication apparatus and a first server direct-mode communication apparatus comprised therein (e.g., the first client direct-mode communication apparatus 11 and the first server direct-mode communication apparatus 13 of the previous embodiment). Steps of the seventh embodiment will be detailed as follows.

Firstly, step 701 is executed to enable the first server direct-mode communication apparatus to transmit a synchronization signal to the first client direct-mode communication apparatus. Then, step 702 is executed to enable the first client direct-mode communication apparatus to synchronize to the first server direct-mode communication apparatus according to the synchronization signal. Finally, step 703 is executed to enable the first client direct-mode communication apparatus to create a communication connection in the EPC-less direct-mode communication system.

Figure 8:
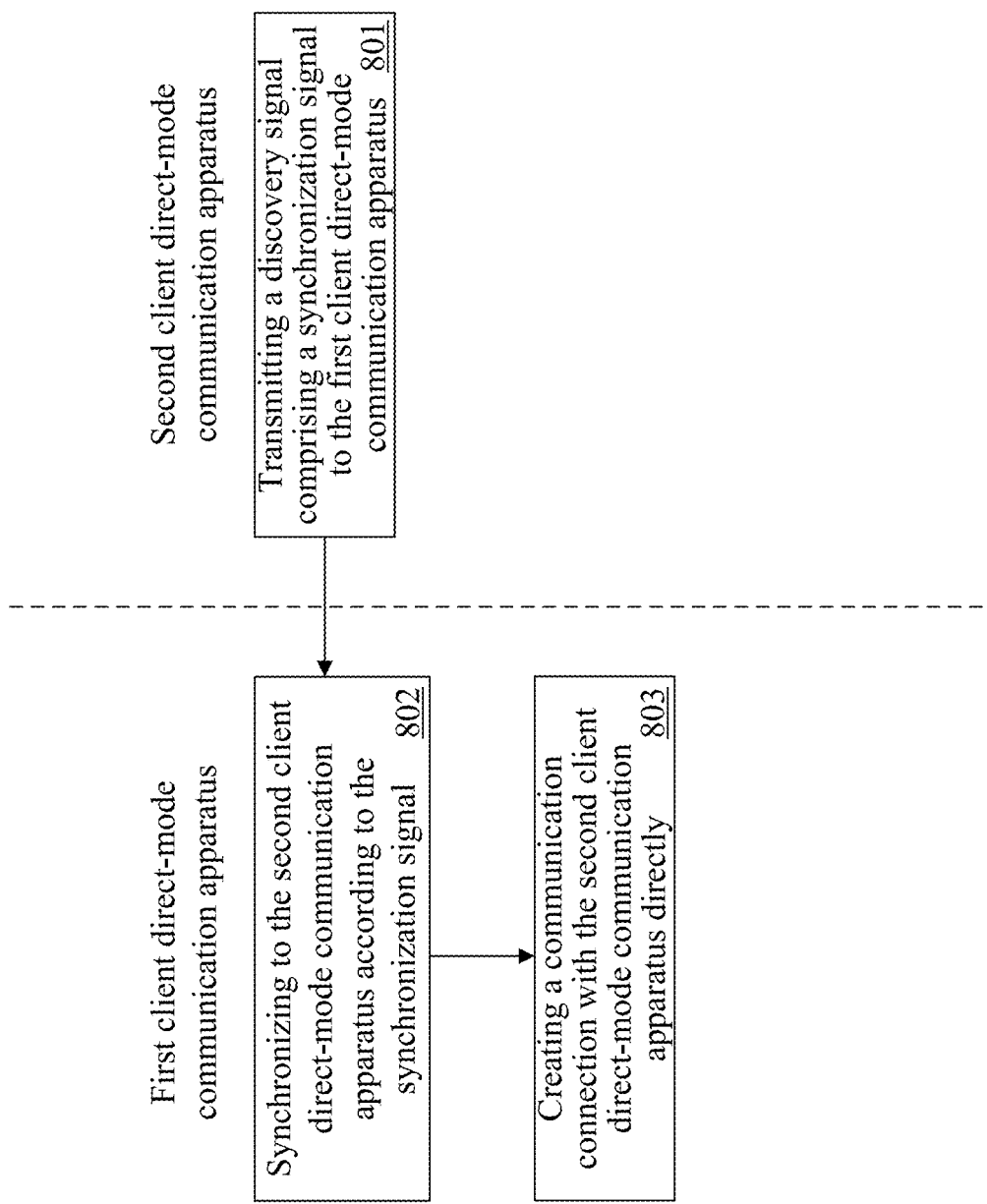
FIG. 8 is a flowchart diagram of a communication attaching method according to an eighth embodiment of the present invention.

An eighth embodiment of the present invention is a communication attaching method, a flowchart diagram of which is shown in FIG. 8. The method of the eighth embodiment is for use in an EPC-less direct-mode communication system (e.g., the EPC-less direct-mode communication system 2 of the previous embodiment) as well as a first client direct-mode communication apparatus and a second client direct-mode communication apparatus comprised therein. Steps of the eighth embodiment will be detailed as follows.

Firstly, step 801 is executed to enable the second client direct-mode communication apparatus to transmit a discovery signal to the first client direct-mode communication apparatus in a signal detection period of the first client direct-mode communication apparatus. The discovery signal comprises a synchronization signal. Then, step 803 is executed to enable the first client direct-mode communication apparatus to synchronize to the second client direct-mode communication apparatus according to the synchronization signal. Finally, step 803 is executed to enable the first client direct-mode communication apparatus to create a communication connection with the second client direct-mode communication apparatus of the EPC-less direct-mode communication system directly.

Figure 9:
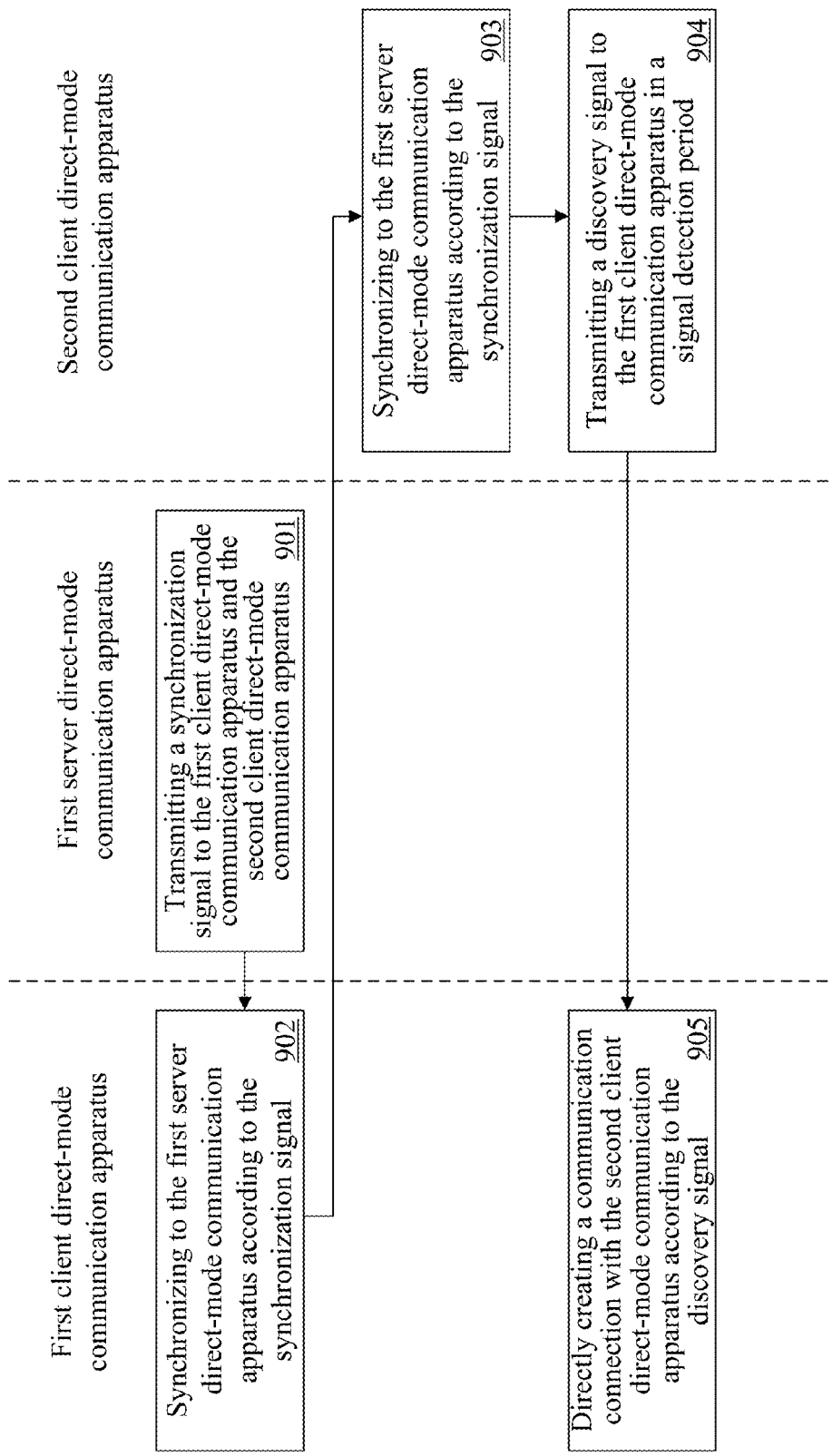
FIG. 9 is a flowchart diagram of a communication attaching method according to a ninth embodiment of the present invention.

A ninth embodiment of the present invention is a communication attaching method, a flowchart diagram of which is shown in FIG. 9. The method of the ninth embodiment is for use in an EPC-less direct-mode communication system (e.g., the EPC-less direct-mode communication system 3 of the previous embodiment) as well as a first client direct-mode communication apparatus, a second client direct-mode communication apparatus and a first server direct-mode communication apparatus comprised therein. Steps of the ninth embodiment will be detailed as follows.

Firstly, step 901 is executed to enable the first server direct-mode communication apparatus to transmit a synchronization signal to the first client direct-mode communication apparatus and the second client direct-mode communication apparatus. Then, step 902 is executed to enable the first client direct-mode communication apparatus to synchronize to the first server direct-mode communication apparatus according to the synchronization signal. Meanwhile, step 903 is executed to enable the second client direct-mode communication apparatus to synchronize to the first server direct-mode communication apparatus according to the synchronization signal.

Next, step 904 is executed to enable the second client direct-mode communication apparatus to transmit a discovery signal to the first client direct-mode communication apparatus in a signal detection period of the first client direct-mode communication apparatus. Finally, step 905 is executed to enable the first client direct-mode communication apparatus to directly create a communication connection with the second client direct-mode communication apparatus of the EPC-less direct-mode communication system according to the discovery signal.

Figure 10:
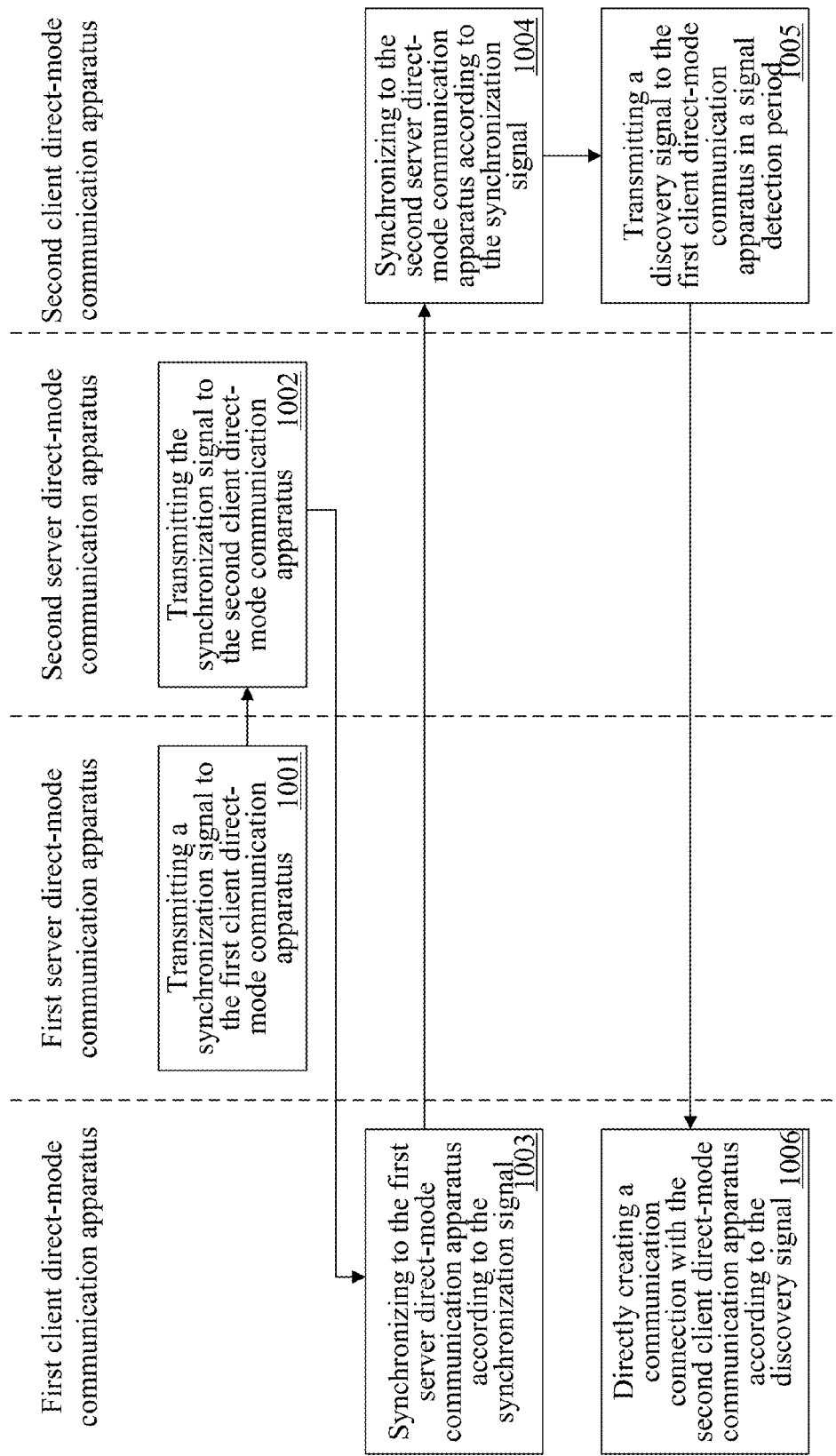
FIG. 10 is a flowchart diagram of a communication attaching method according to a tenth embodiment of the present invention.

A tenth embodiment of the present invention is a communication attaching method, a flowchart diagram of which is shown in FIG. 10. The method of the tenth embodiment is for use in an EPC-less direct-mode communication system (e.g., the EPC-less direct-mode communication system 4 of the previous embodiment) as well as a first client direct-mode communication apparatus, a second client direct-mode communication apparatus, a first server direct-mode communication apparatus and a second server direct-mode communication apparatus comprised therein. The first server direct-mode communication apparatus and the second server direct-mode communication apparatus have the same synchronization signal. Steps of the tenth embodiment will be detailed as follows.

Firstly, step 1001 is executed to enable the first server direct-mode communication apparatus to transmit a synchronization signal to the first client direct-mode communication apparatus. Then, step 1002 is executed to enable the second server direct-mode communication apparatus to transmit the synchronization signal to the second client direct-mode communication apparatus. Then, step 1003 is executed to enable the first client direct-mode communication apparatus to synchronize to the first server direct-mode communication apparatus according to the synchronization signal. Next, step 1004 is executed to enable the second client direct-mode communication apparatus to synchronize to the second server direct-mode communication apparatus according to the synchronization signal.

Next, step 1005 is executed to enable the second client direct-mode communication apparatus to transmit a discovery signal to the first client direct-mode communication apparatus in a signal detection period of the first client direct-mode communication apparatus. Finally, step 1006 is executed to enable the first client direct-mode communication apparatus to directly create a communication connection with the second client direct-mode communication apparatus of the EPC-less direct-mode communication system according to the discovery signal.

Figure 11:
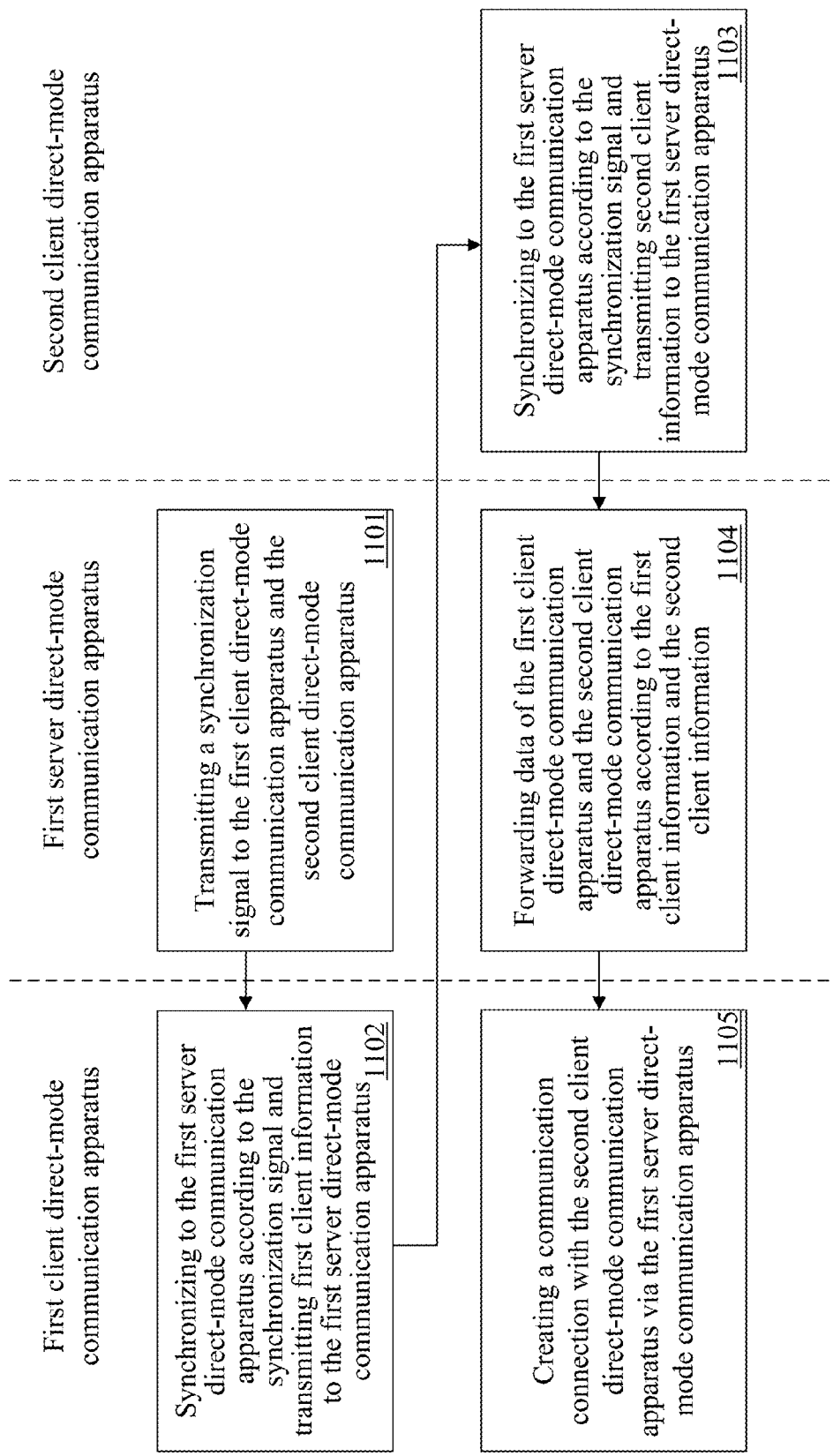
FIG. 11 is a flowchart diagram of a communication attaching method according to an eleventh embodiment of the present invention.

An eleventh embodiment of the present invention is a communication attaching method, a flowchart diagram of which is shown in FIG. 11. The method of the eleventh embodiment is for use in an EPC-less direct-mode communication system (e.g., the EPC-less direct-mode communication system 5 of the previous embodiment) as well as a first client direct-mode communication apparatus, a second client direct-mode communication apparatus and a first server direct-mode communication apparatus comprised therein. Steps of the eleventh embodiment will be detailed as follows.

Firstly, step 1101 is executed to enable the first server direct-mode communication apparatus to transmit a synchronization signal to the first client direct-mode communication apparatus and the second client direct-mode communication apparatus. Then, step 1102 is executed to enable the first client direct-mode communication apparatus to synchronize to the first server direct-mode communication apparatus according to the synchronization signal and transmit a piece of first client information to the first server direct-mode communication apparatus.

Next, step 1103 is executed to enable the second client direct-mode communication apparatus to synchronize to the first server direct-mode communication apparatus according to the synchronization signal and transmit a piece of second client information to the first server direct-mode communication apparatus. Step 1104 is executed to enable the first server direct-mode communication apparatus to forward data of the first client direct-mode communication apparatus and the second client direct-mode communication apparatus according to the first client information and the second client information. Finally, step 1105 is executed to enable the first client direct-mode communication apparatus to create a communication connection with the second client direct-mode communication apparatus via the first server direct-mode communication apparatus of the EPC-less direct-mode communication system.

Figure 12:
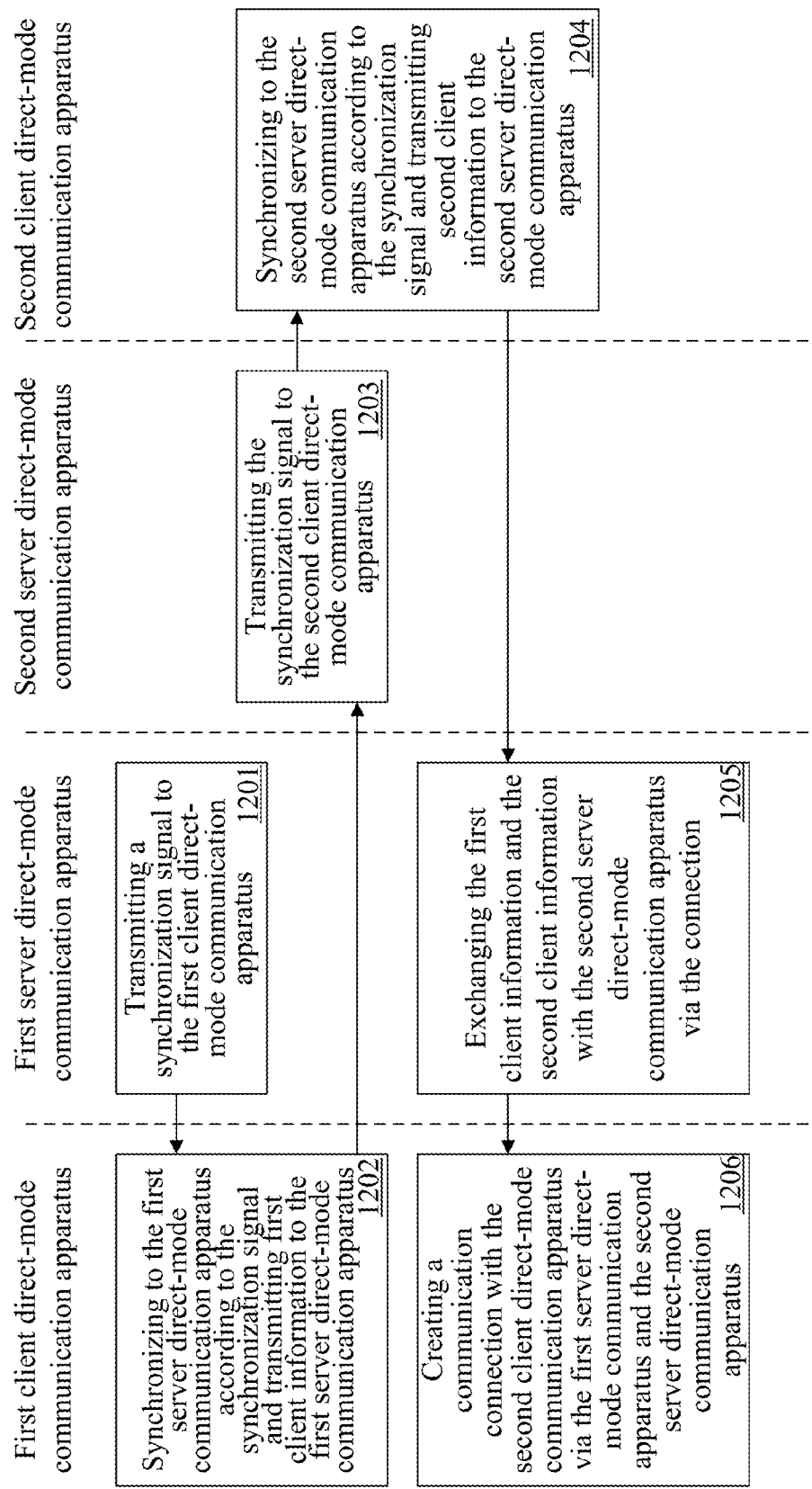
FIG. 12 is a flowchart diagram of a communication attaching method according to a twelfth embodiment of the present invention.

A twelfth embodiment of the present invention is a communication attaching method, a flowchart diagram of which is shown in FIG. 12. The method of the twelfth embodiment is for use in an EPC-less direct-mode communication system (e.g., the EPC-less direct-mode communication system 6 of the previous embodiment) as well as a first client direct-mode communication apparatus, a second client direct-mode communication apparatus, a first server direct-mode communication apparatus and a second server direct-mode communication apparatus comprised therein. The first server direct-mode communication apparatus and the second server direct-mode communication apparatus are synchronized to each other according to a synchronization signal via a connection. Steps of the twelfth embodiment will be detailed as follows.

Firstly, step 1201 is executed to enable the first server direct-mode communication apparatus to transmit a synchronization signal to the first client direct-mode communication apparatus. Then, step 1202 is executed to enable the first client direct-mode communication apparatus to synchronize to the first server direct-mode communication apparatus according to the synchronization signal and transmit a piece of first client information to the first server direct-mode communication apparatus.

Next, step 1203 is executed to enable the second server direct-mode communication apparatus to transmit the synchronization signal to the second client direct-mode communication apparatus. Then, step 1204 is executed to enable the second client direct-mode communication apparatus to synchronize to the second server direct-mode communication apparatus according to the synchronization signal and transmit a piece of second client information to the second server direct-mode communication apparatus.

Afterwards, step 1205 is executed to enable the first server direct-mode communication apparatus to exchange the first client information and the second client information with the second server direct-mode communication apparatus via the connection. Finally, step 1206 is executed to enable the first client direct-mode communication apparatus to create a communication connection with the second client direct-mode communication apparatus via the first server direct-mode communication apparatus and the second server direct-mode communication apparatus.

According to the above descriptions, the EPC-less direct-mode communication system and the communication attaching method thereof according to the present invention allow direct-mode communication apparatuses of the EPC-less direct-mode communication system to be synchronized to and coordinate with each other in the absence of a backhaul core network so as to create direct-mode communications therebetween successfully. Thereby, the application scope and flexibility in use of direct-mode communication apparatuses can be significantly improved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A communication attaching method for an evolved packet core less (EPC-less) direct-mode communication system, the EPC-less direct-mode communication system comprising a first client direct-mode communication apparatus, a second client direct-mode communication apparatus and a first server direct-mode communication apparatus, the communication attaching method comprising:
   (a) transmitting, by the first server direct-mode communication apparatus, a synchronization signal to the first client direct-mode communication apparatus and the second client direct-mode communication apparatus;
   (b1) synchronizing, by the first client direct-mode communication apparatus, to the first server direct-mode communication apparatus according to the synchronization signal and transmitting a piece of first client information to the first server direct-mode communication apparatus;
   (b2) synchronizing, by the second client direct-mode communication apparatus, to the first server direct-mode communication apparatus according to the synchronization signal and transmitting a piece of second client information to the first server direct-mode communication apparatus;
   (b3) forwarding, by the first server direct-mode communication apparatus, data of the first client direct-mode communication apparatus and the second client direct-mode communication apparatus according to the first client information and the second client information;
   (c1) transmitting, by the second client direct-mode communication apparatus, a discovery signal to the first client direct-mode communication apparatus in a signal detection period of the first client direct-mode communication apparatus after the step (b3); and
   (c2) creating, by the first client direct-mode communication apparatus, a communication connection with the second direct-mode communication apparatus in the EPC-less direct-mode communication system directly according to the discovery signal;
   wherein the first client direct-mode communication apparatus and the second client direct-mode communication apparatus are user equipment, and the first server direct-mode communication apparatus comprises an evolved nodeB.

2. A communication attaching method for an evolved packet core less (EPC-less) direct-mode communication system, the EPC-less direct-mode communication system comprising a first client direct-mode communication apparatus, a second client direct-mode communication apparatus, a first server direct-mode communication apparatus and a second server direct-mode communication apparatus, the first server direct-mode communication apparatus and the second server direct-mode communication apparatus being synchronized to each other via a connection according to a synchronization signal, the communication attaching method comprising:
   (a1) transmitting, by the first server direct-mode communication apparatus, the synchronization signal to the first client direct-mode communication apparatus;
   (a2) transmitting, by the second server direct-mode communication apparatus, the synchronization signal to the second client direct-mode communication apparatus;
   (b1) synchronizing, by the first client direct-mode communication apparatus, to the first server direct-mode communication apparatus according to the synchronization signal and transmitting a piece of first client information to the first server direct-mode communication apparatus;
   (b2) synchronizing, by the second client direct-mode communication apparatus, to the second server direct-mode communication apparatus according to the synchronization signal and transmitting a piece of second client information to the second server direct-mode communication apparatus;
   (b3) exchanging, by the first server direct-mode communication apparatus, the first client information and the second client information with the second server direct-mode communication apparatus via the connection;
   (c1) transmitting, by the second client direct-mode communication apparatus, a discovery signal to the first client direct-mode communication apparatus in a signal detection period of the first client direct-mode communication apparatus after the step (b3); and
   (c2) creating, by the first client direct-mode communication apparatus, the communication connection with the second client direct-mode communication apparatus of the EPC-less direct-mode communication system directly according to the discovery signal;
   wherein the first client direct-mode communication apparatus and the second client direct-mode communication apparatus are user equipment, the first server direct-mode communication apparatus comprises an evolved nodeB, and the second server direct-mode communication apparatus comprises an evolved nodeB.

3. The communication attaching method as claimed in claim 2 wherein the connection is an X2 interface connection.

4. An evolved packet core less (EPC-less) direct-mode communication system, comprising:
   a first client direct-mode communication apparatus, which is a user equipment;
   a second client direct-mode communication apparatus, which is a user equipment; and
   a first server direct-mode communication apparatus, which comprises an evolved nodeB;
   wherein the first server direct-mode communication apparatus transmits a synchronization signal to the first client direct-mode communication apparatus and the second client direct-mode communication apparatus, the first client direct-mode communication apparatus synchronizes to the first server direct-mode communication apparatus according to the synchronization signal and transmits a piece of first client information to the first server direct-mode communication apparatus, the second client direct-mode communication apparatus synchronizes to the first server direct-mode communication apparatus according to the synchronization signal and transmits a piece of second client information to the first server direct-mode communication apparatus, the first server direct-mode communication apparatus forwards data of the first client direct-mode communication apparatus and the second client direct-mode communication apparatus according to the first client information and the second client information, the second client direct-mode communication apparatus transmits a discovery signal to the first client direct-mode communication apparatus in a signal detection period of the first client direct-mode communication apparatus, and the first client direct-mode communication apparatus creates a communication connection with the second direct-mode communication apparatus in the EPC-less direct-mode communication system directly according to the discovery signal.

5. An evolved packet core less (EPC-less) direct-mode communication system, comprising:
   a first client direct-mode communication apparatus, which is first user equipment;
   a second client direct-mode communication apparatus, which is second user equipment;
   a first server direct-mode communication apparatus, which comprises an evolved nodeB; and
   a second server direct-mode communication apparatus, which comprises an evolved nodeB;
   wherein the first server direct-mode communication apparatus and the second server direct-mode communication apparatus are synchronized to each other via a connection according to a synchronization signal, the first server direct-mode communication apparatus transmits the synchronization signal to the first client direct-mode communication apparatus, the second server direct-mode communication apparatus transmits the synchronization signal to the second client direct-mode communication apparatus, the first client direct-mode communication apparatus synchronizes to the first server direct-mode communication apparatus according to the synchronization signal and transmits a piece of first client information to the first server direct-mode communication apparatus, the second client direct-mode communication apparatus synchronizes to the second server direct-mode communication apparatus according to the synchronization signal and transmits a piece of second client information to the second server direct-mode communication apparatus, the first server direct-mode communication apparatus exchanges the first client information and the second client information with the second server direct-mode communication apparatus via the connection, the second client direct-mode communication apparatus transmits a discovery signal to the first client direct-mode communication apparatus in a signal detection period of the first client direct-mode communication apparatus, and the first client direct-mode communication apparatus creates a communication connection with the second direct-mode communication apparatus in the EPC-less direct-mode communication system directly according to the discovery signal.

6. The EPC-less direct-mode communication system as claimed in claim 5, wherein the connection is an X2 interface connection.

7. A communication attaching method for a first client direct-mode communication apparatus, the first client direct-mode communication apparatus being used in an evolved packet core less (EPC-less) direct-mode communication system, the EPC-less direct-mode communication system further comprising a second client direct-mode communication apparatus and a first server direct-mode communication apparatus, the communication attaching method comprising:
   (a) receiving, by the first client direct-mode communication apparatus, a synchronization signal from the first server direct-mode communication apparatus, wherein the first server direct-mode communication transmits the synchronization signal to the second client direct-mode communication apparatus at the same time so that the second client direct-mode communication apparatus synchronizes to the first server direct-mode communication apparatus according to the synchronization signal;
   (b) synchronizing, by the first client direct-mode communication apparatus, to the first server direct-mode communication apparatus according to the synchronization signal;
   (c1) receiving, by the first client direct-mode communication apparatus, a discovery signal from the second client direct-mode communication apparatus in a signal detection period after the step (b); and
   (c2) creating, by the first client direct-mode communication apparatus, a communication connection with the second direct-mode communication apparatus in the EPC-less direct-mode communication system according to the discovery signal;
   wherein the first client direct-mode communication apparatus and the second client direct-mode communication apparatus are user equipment, and the first server direct-mode communication apparatus comprises an evolved nodeB.

8. A communication attaching method for a first client direct-mode communication apparatus, the first client direct-mode communication apparatus being used in an evolved packet core less (EPC-less) direct-mode communication system, the EPC-less direct-mode communication system further comprising a second client direct-mode communication apparatus, a first server direct-mode communication apparatus and a second server direct-mode communication apparatus, the first server direct-mode communication apparatus and the second server direct-mode communication apparatus being synchronized to each other via a connection according to a synchronization signal, the communication attaching method comprising:
   (a) receiving, by the first client direct-mode communication apparatus, the synchronization signal from the first server direct-mode communication apparatus, wherein the second server direct-mode communication device transmits the synchronization signal to the second client direct-mode communication device;
   (b1) synchronizing, by the first client direct-mode communication apparatus, to the first server direct-mode communication apparatus according to the synchronization signal, wherein the second client direct-mode communication apparatus synchronizes to the second server direct-mode communication apparatus according to the synchronization signal;
   (c1) receiving, by the first client direct-mode communication apparatus, a discovery signal from the second client direct-mode communication apparatus in a signal detection period after the step (b); and (c2) creating, by the first client direct-mode communication apparatus, the communication connection with the second client direct-mode communication apparatus of the EPC-less direct-mode communication system directly according to the discovery signal;

wherein the first client direct-mode communication apparatus and the second client direct-mode communication apparatus are user equipment, the first server direct-mode communication apparatus comprises an evolved nodeB, and the second server direct-mode communication apparatus comprises an evolved nodeB.

9. A first client direct-mode communication apparatus for use in an EPC-less direct-mode communication system, the EPC-less direct-mode communication system further comprising a second client direct-mode communication apparatus and a first server direct-mode communication apparatus, the first client direct-mode communication apparatus comprising:

a processor; and a transceiver;

wherein the transceiver is configured to receive a synchronization signal from the first server direct-mode communication apparatus while the first server direct-mode communication transmits the synchronization signal to the second client direct-mode communication apparatus at the same time so that the second client direct-mode communication apparatus synchronizes to the first server direct-mode communication apparatus according to the synchronization signal, the processor is configured to synchronize to the first server direct-mode communication apparatus according to the synchronization signal, the transceiver is configured to receive a discovery signal from the second client direct-mode communication apparatus in a signal detection period, and the processor is configured to create a communication connection with the second direct-mode communication apparatus in the EPC-less direct-mode communication system via the transceiver according to the discovery signal; and wherein the first client direct-mode communication apparatus and the second client direct-mode communication apparatus are user equipment, and the first server direct-mode communication apparatus comprises an evolved nodeB.

10. A first client direct-mode communication apparatus for use in an EPC-less direct-mode communication system, the EPC-less direct-mode communication system further comprising a second client direct-mode communication apparatus, a first server direct-mode communication apparatus and a second server direct-mode communication apparatus, the first server direct-mode communication apparatus and the second server direct-mode communication apparatus being synchronized to each other via a connection according to a synchronization signal, the first client direct-mode communication apparatus comprising:

a processor; and a transceiver;

wherein the transceiver is configured to receive the synchronization signal from the first server direct-mode communication apparatus while the second server direct-mode communication device transmits the synchronization signal to the second client direct-mode communication device, the processor is configured to synchronize to the first server direct-mode communication apparatus according to the synchronization signal while the second client direct-mode communication apparatus synchronizes to the second server direct-mode communication apparatus according to the synchronization signal, the transceiver is configured to receive a discovery signal from the second client direct-mode communication apparatus in a signal detection period, the processor is configured to create a communication connection with the second direct-mode communication apparatus in the EPC-less direct-mode communication system via the transceiver according to the discovery signal; and wherein the first client direct-mode communication apparatus and the second client direct-mode communication apparatus are user equipment, the first server direct-mode communication apparatus comprises an evolved nodeB, and the second server direct-mode communication apparatus comprises an evolved nodeB.

11. A communication attaching method for a server direct-mode communication apparatus, the server direct-mode communication apparatus being used in an EPC-less direct-mode communication system that further comprises a first client direct-mode communication apparatus and a second client direct-mode communication apparatus, the communication attaching method comprising:

(a) transmitting, by the server direct-mode communication apparatus, a synchronization signal to the first client direct-mode communication apparatus and the second client direct-mode communication apparatus so that the first client direct-mode communication apparatus and the second client direct-mode communication apparatus synchronize to the server direct-mode communication apparatus according to the synchronization signal;

(b) receiving, by the server direct-mode communication apparatus, a piece of first client information and a piece of second client information from the first client direct-mode communication apparatus and the second client direct-mode communication apparatus respectively after the step (a); and (c) forwarding, by the server direct-mode communication apparatus, data of the first client direct-mode communication apparatus and the second client direct-mode communication apparatus according to the first client information and the second client information so that the first client direct-mode communication apparatus and the second client direct-mode communication apparatus create a communication connection therebetween;

wherein the first client direct-mode communication apparatus and the second client direct-mode communication apparatus are user equipment, and the first server direct-mode communication apparatus comprises an evolved nodeB.

12. A server direct-mode communication apparatus for use in an EPC-less direct-mode communication system, the EPC-less direct-mode communication system further comprising a first client direct-mode communication apparatus and a second client direct-mode communication apparatus, the server direct-mode communication apparatus comprising:

a processor; and a transceiver;

wherein the transceiver is configured to transmit a synchronization signal to the first client direct-mode communication apparatus and the second client direct-mode communication apparatus so that the first client direct-mode communication apparatus and the second client direct-mode communication apparatus synchronize to the server direct-mode communication apparatus according to the synchronization signal; the transceiver is further configured to receive a piece of first client information and a piece of second client information from the first client direct-mode communication apparatus and the second client direct-mode communication apparatus respectively; and the processor is configured to forward data of the first client direct-mode communication apparatus and the second client direct-mode communication apparatus via the transceiver according to the first client information and the second client information so that the first client direct-mode communication apparatus and the second client direct-mode communication apparatus create a communication connection therebetween; and wherein the first client direct-mode communication apparatus and the second client direct-mode communication apparatus are user equipment, and the first server direct-mode communication apparatus is an evolved nodeB.

13. A communication attaching method for a first server direct-mode communication apparatus, the first server direct-mode communication apparatus being used in an EPC-less direct-mode communication system that further comprises a first client direct-mode communication apparatus, a second client direct-mode communication apparatus and a second server direct-mode communication apparatus, the first server direct-mode communication apparatus and the second server direct-mode communication apparatus being synchronized to each other via a connection according to a synchronization signal, the communication attaching method comprising:

(a) transmitting, by the first server direct-mode communication apparatus, the synchronization signal to the first client direct-mode communication apparatus so that the first client direct-mode communication apparatus synchronizes to the first server direct-mode communication apparatus according to the synchronization signal and transmits a piece of first client information to the first server direct-mode communication apparatus, wherein the second server direct-mode communication apparatus transmits the synchronization signal to the second client direct-mode communication apparatus so that the second client direct-mode communication apparatus synchronizes to the second server direct-mode communication apparatus according to the synchronization signal and transmits a piece of second client information to the second server direct-mode communication apparatus; and (b) exchanging, by the first server direct-mode communication apparatus, the first client information and the second client information with the second server direct-mode communication apparatus via the connection so that the first client direct-mode communication apparatus creates a communication connection with the second client direct-mode communication apparatus via the first server direct-mode communication apparatus and the second server direct-mode communication apparatus;

wherein the first client direct-mode communication apparatus and the second client direct-mode communication apparatus are user equipment, and the first server direct-mode communication apparatus and the second server direct-mode communication apparatus are evolved nodeBs.

14. The communication attaching method as claimed in claim 13 wherein the connection is an X2 interface connection.

15. A first server direct-mode communication apparatus for use in an EPC-less direct-mode communication system, the EPC-less direct-mode communication system further comprising a first client direct-mode communication apparatus, a second client direct-mode communication apparatus and a second server direct-mode communication apparatus, the first server direct-mode communication apparatus and the second server direct-mode communication apparatus being synchronized to each other via a connection according to a synchronization signal, the first server direct-mode communication apparatus comprising:

a processor; and
a transceiver;

wherein the transceiver is configured to transmit the synchronization signal to the first client direct-mode communication apparatus so that the first client direct-mode communication apparatus synchronizes to the first server direct-mode communication apparatus according to the synchronization signal and transmits a piece of first client information to the first server direct-mode communication apparatus, wherein the second server direct-mode communication apparatus transmits the synchronization signal to the second client direct-mode communication apparatus so that the second client direct-mode communication apparatus synchronizes to the second server direct-mode communication apparatus according to the synchronization signal and transmits a piece of second client information to the second server direct-mode communication apparatus; and the processor is configured to exchange the first client information and the second client information with the second server direct-mode communication apparatus through the transceiver and via the connection so that the first client direct-mode communication apparatus creates a communication connection with the second client direct-mode communication apparatus via the first server direct-mode communication apparatus and the second server direct-mode communication apparatus; and wherein the first client direct-mode communication apparatus and the second client direct-mode communication apparatus are user equipment, and the first server direct-mode communication apparatus and the second server direct-mode communication apparatus are evolved nodeBs.

16. The first server direct-mode communication apparatus as claimed in claim 15, wherein the connection is an X2 interface connection.

* * * * *